3,232,832
CELLULASE COMPOSITIONS AND METHODS OF USING SAME
Hiroomi Ono, Osaka, Japan, assignor to Takeda Chemical Industries, Ltd., Osaka, Japan
No Drawing. Filed Jan. 31, 1963, Ser. No. 255,177
9 Claims. (Cl. 167—53)

This invention relates to veterinary drugs which are characterized in that they contain cellulase produced by the fermentation of Rhizopus microorganisms.

This application is a continuation-in-part of copending application Serial No. 16,157, filed March 21, 1960 (now abandoned).

Cellulase is an enzyme capable of hydrolyzing cellulose into water-soluble low molecular sugars which are easily digestible by the animal organs. The present inventor has discovered that the feeding of animals with feedstuff containing cellulase can improve the body weight of the animals, the cellulase being produced by the fermentation of Rhizopus microorganisms. The cellulase has very strong activity on cellulose so that the feedstuff containing the cellulase is superior to any of known animal feedstuffs by which the promotion of animal body weight is intended.

The present inventor has also discovered through further research that animal diseases of the digestive organs can be cured by the administration of veterinary drugs containing cellulase produced by the fermentation of Rhizopus microorganisms.

The object of this invention is thus to use the cellulase-containing veterinary drug for the treatment of animal diseases of the digestive organs, e.g. stomach and intestine.

The veterinary drug of this invention contains cellulase which is produced by the fermentation of Rhizopus microorganisms. The Rhizopus microorganisms may be *Rhizopus nigrican, Rhizopus chinensis, Rhizopus niveus, Rhizopus oryzae*, or the like. They can produce cellulase usable in this invention. These microorganisms may be incubated in a liquid or in a solid medium for the production of cellulase, but the use of liquid media is preferable for industrial purposes. The incubation may be conducted under aerobic conditions with agitation. In such case, the cellulase can be collected from the fermentation broth of the Rhizopus microorganisms by utilizing its solubility in an aqueous solvent. It is soluble in water or in an aqueous solution of an organic solvent or of an inorganic salt having a rather low concentration, but insoluble in an aqueous solution of an organic solvent or of an inorganic salt having a relatively high concentration. Therefore, it is advantageous for the collection of the cellulase from the fermentation broth to utilize a fractional precipitation process. That is, an organic solvent or an inorganic salt is added to the filtered broth of the fermentation or to an aqueous solution of the cellulase to separate the cellulase. As the organic solvent there may be employed a water-miscible neutral or nearly neutral solvent such as methanol, ethanol, acetone and the like. As the inorganic salt there may be employed a water-soluble neutral or nearly neutral salt such as ammonium sulfate, sodium sulfate, sodium chloride, potassium chloride and the like. The solubility of the cellulase in an aqueous organic solvent or in an aqueous salt solution varies with the concentration of the solvent or the salt employed. The cellulase usable in this invention is soluble in 50%-saturated acetone solution or in 30%-saturated ammonium sulfate solution, and insoluble in 60%-saturated acetone solution or in 60%-saturated ammonium sulfate solution (these percentages are by weight). As the cellulase is generally present in a fermentation broth of the Rhizopus microorganism, the cellulase can be collected by the direct addition of an organic solvent or of an inorganic salt to the fermentation filtrate. Moreover, the cellulase thus precipitated may be employed as such for the purpose of this invention, although it may contain "impurities" such as other kinds of enzymes (lipase, protease, amylase, etc.), inorganic substances, organic substances originating from the fermentation process. If it is necessary to purify the cellulase further, the above mentioned fractional precipitation process may be repeated; or the fermentation broth or the filtrate or an aqueous solution of the crude cellulase may be heated to separate thermally coagulable protein substances. The cellulase of Rhizopus microorganisms is stable against heat. Though so-far-known cellulases produced from various sources are all unstable at a temperature higher than about 50° C., the cellulase of Rhizopus microorganisms is stable at temperatures of this order. More concretely, while the cellulase loses its activity when heated at a temperature as high as 100° C., it never loses its activity at a temperature up to 60° C. even when heated for three hours. Hence, the solution of the cellulase (including the fermentation broth or the filtrate) may be heated at a temperature lower than 60° C. At such temperature, all the protein substances contained in the material as impurities are changed into readily removable water-insoluble form. Protein substances so changed in form can readily be removed by filtration or centrifugation.

If it is desired to obtain the cellulase in still purer form, it can be purified through dialysis of its aqueous solution using a bladder bag, cellophane, or the like; or the crude cellulase may be subjected to a process utilizing an ion-exchange resin to eliminate impurities as colored substances. Any desired cation-exchange resin can be used for this purpose. A highly cross-linked anion exchange resin of the granular aliphatic amine resin type (such as Duolite A–2 and Duolite A–7, Chemical Process Co., Redwood City, Calif.) is most suitable for the purpose, however, in view of its capacity for decoloration and its adsorbability as well as of its properties of not denaturalizing and deactivating the cellulase.

The cellulase may, if desired, be further purified by adsorption on and elution from a cross-linked exchange carboxylic acid resin of the acrylic type (such as Amberlite XE–64 and Amberlite IRC–50, Rohm & Haas Co., Philadelphia, Pa.), or by electrophoresis.

Though there are thus several available processes for purifying the cellulase, it is, in general, unnecessary to purify the cellulase further than the state of the precipitate formed in the fractional precipitation process.

The cellulase of the Rhizopus microorganisms is, as mentioned above, stable against heat, which is one of its characteristic properties and which is found in no other types of enzymes including cellulases from prior known origins. Other characteristic properties of the cellulase of Rhizopus microorganisms can be itemized as follows:

(1) The cellulase is liable to hydrolyze denaturalized cellulose rather than natural cellulose.

(2) The cellulase is stable at a wide range of pH. That is, at e.g. pH 2.1, 4.25, 5.3, 5.9 and 6.3, the cellulase does not lose its activity at all for as long as 13 days, when it is stored at 37° C. as solution. And, even at pH 11.2, it does not change for at least 2 days.

(3) The most suitable pH for hydrolysis of cellulose by the cellulase is on the acid side and maximum hydrolysis is observed at pH 4.1.

(4) An isoelectric point of the cellulase is observed at about pH 10.6.

The feedstuff containing the above explained cellulase produced by the fermentation of Rhizopus microorganisms can be fed to an animal for the purpose of promoting animal growth. The growth of animals is promoted when they are fed with such a feedstuff, which can be observed in the remarkable increase of their body weight. This increase in body weight is caused by the digestive action of the cellulase added to the feedstuff as well as by the activation of Cellulomonas microorganisms in the digestive organs of animals by the cellulase.

The veterinary drug of this invention contains the cellulase explained above as its chief component, which cellulase is not necessarily purified to higher purity. According to the stage and manner of the purification, cellulases of optional purities may be obtained, and all of these can be employed for making the veterinary drug of this invention. The impurities which may be present in the crude cellulase have no toxicity to animal bodies, even when the animals are suffering from some diseases of the digestive organs, in most cases. And, the veterinary drug of this invention may contain, other than the cellulase, stomachics, constipating remedies, sulfonamide drugs, digestant or the like. Moreover, suitable excipients or diluents may be incorporated therein.

As the animal diseases which can be remedied by the veterinary drug of this invention, there may be, for example, acute dilatation, dyspepsia, disturbance of digestion, enterogastritis, gastric dilatation, tympanitis ruminantium, diarrhea, anorexia and overfeeding in the stomach. The animals to be treated may be cattle, pigs, horses, sheep, dogs and domestic fowl, for instance. The veterinary drug may be administered orally to the animals suffering from such diseases as above in an appropriate dosis. The dosis may be determined in accordance with the kind of animals, body weight of the animals, kind of diseases, symptoms, or the like. But, the usual dosis to be administered to larger animals (such as cattle, horse, pig and sheep) is about 150,000 to 3,000,000 units per day of cellulase (regarding the unit of cellulase activity, the explanation will be given later on), the dosis to the smaller animals may be determined in accordance with their body weight, e.g. to dog about 20,000 to 300,000 units per day. As the cellulase of this invention has no toxicity to animal bodies, it may be administered in a large excess dosis.

The veterinary drug may be administered as it is or with water or with suitable feedstuff. Feedstuffs may include roughage or concentrates, preferably roughage.

Roughages to be employed in this invention may be, for example, be grass or hay of Gramineae or Leguminosae plants or their straws, sweet potato straws, mulberry or other tree leaves, cottonseed chaffs or husks. In addition to the above, seaweed, sawdust, etc., may also be employed in this invention.

When oral administration is difficult by reason of the symptom, the drug may conveniently be administered through the nose making the drug an aqueous suspension.

The administration of this drug cures animals suffering from various diseases of the digestive organs. In addition, the drug shows remarkable clinical and veterinary effects on the treated animals. Examples of such effects are early weaning of calves, the enhancement of digestive ability of weak sucklings, the improvement of properties of wools and the promotion of rumen flora and repression of abnormal fermentation in stomach of cattle.

Thus, the veterinary drug may also be administered for improving the health of domestic animals. In such a case the dosis may be lowered to about one tenth of the aforementioned one, and it is preferable to administer the drug together with the animal's daily feedstuff.

Examples for effecting the present invention are set out below, and in these examples as well as in the aforementioned dosis the unit of cellulase activity is calculated as follows:

"N" milligrams of the cellulase of the Rhizopus microorganism is added to a 0.5% solution of carboxymethylcellulose in a 0.05 mole acetic acid buffer solution (pH 5.0), and the mixture is allowed to stand at 60° C. for one hour. The concentration of the reduced sugar formed is "A" gammas per milliliter as glucose.

The unit of cellulose activity per milligram =

$$\frac{3.436 \times 10^{0.00425A}}{N}$$

In these examples, the percentages are by weight.

*Example 1*

Rhizopus oryzae is inoculated in an aqueous medium composed of 9% of cornsteep liquor, 8% of ammonium sulfate, 12% of dextrin, 4.5% of calcium carbonate, and water, and showing a pH of 6.8, and the mixture is aerobically incubated at a temperature of 27–28° C. for 66–72 hours with agitation. A filter aid (diatomaceous earth) is added to 70 liters of the broth, and the mixture is filtered. The filtrate is adjusted to pH 5.0 and a saturated aqueous solution of ammonium sulfate is added until the concentration of ammonium sulfate in the solution reaches 70%. The precipitate thus formed is filtered in the presence of the filter aid, and the precipitate including the filter aid is added to water, whereby the precipitate dissolves in water, and the insoluble filter aid is then filtered off. To the filtrate is added 3.5 kilograms of ammonium sulfate to precipitate crude cellulase. The crude cellulase collected by centrifugation shows an activity of 70,000 units per gram. The crude cellulase contains a little lipase, amylase, protease, etc., and about 1.4% of ammonium sulfate. The crude cellulase obtained by a process as herein described is called "cellulase (A)" hereinafter, and it usually shows a cellulase activity of around 50,000 to 100,000 units per gram.

*Example 2*

Cellulase (A) is dissolved in a small quantity of water, and the solution is dialyzed with flowing water in a bladder bag for 5 days. The impurities thus separated are removed, and the filtrate is heated at a temperature of 60° C. for 3 hours. The insoluble matters separated in this way are filtered off. The solution is passed through a tower packed with 5 liters of weakly basic anion exchange resin which has been treated beforehand with 0.5 mole of acetic acid buffer solution (pH 5.0). The effluent is then passed through another tower packed with 2 liters of a cation exchange resin, as heinbefore identified. The latter column, after washing with 0.1 mole of acetic acid buffer solution (pH 5.0), is eluted with 10 moles of sodium acetate solution (pH 7.5). In 10 liters of the effluent, there is dissolved 5 kilograms of ammonium sulfate to form a precipitate. The precipitate is dialyzed as described in Example 1. To the inner solution is added acetone until its concentration reaches 50%, and the precipitate formed is removed. Acetone is further added to make the acetone concentration 60%, whereby a precipitate is formed. The precipitate is freeze-dried to obtain purer cellulase as white powder showing a cellulase activity of 950,000 units per gram. The yield is 25.0 milligrams. The cellulase obtained by such a process as above is called "cellulase (B)" hereinafter. Cellulase (B) usually shows cellulase activity of around 500,000 to 1,000 units per gram.

Cellulase (B) may be subjected to conventional electrophoresis to increase its activity to around 2,700,000 units per gram.

*Example 3*

The procedure according to Example 1 is repeated with essentially similar results, using Rhozipus nigricans as the cellulase-producing microorganism instead of Rhizopus oryzae.

*Example 4*

The procedure according to Example 1 is repeated with essentially similar results, using Rhizopus chinensis as the cellulase-producing microorganism instead of *Rhizopus oryzae*.

Example 5

The procedure according to Example 1 is repeated with essentially similar results, using *Rhizopus niveus* as the cellulase-producing microorganism instead of *Rhizopus oryzae*.

Example 6

The procedure according to Example 2 is repeated with essentially similar results, using *Rhizopus nigricans* as the cellulase-producing microorganism instead of *Rhizopus oryzae*.

Example 7

The procedure according to Example 2 is repeated with essentially similar results, using *Rhizopus chinensis* as the cellulase-producing microorganism instead of *Rhizopus oryzae*.

Example 8

The procedure according to Example 2 is repeated with essentially similar results, using *Rhizopus niveus* as the cellulase-producing microorganism instead of *Rhizopus oryzae*.

Example 9

Composition of pulverized drug:

| | Grams |
|---|---|
| Cellulase (A) | 4.5 |
| Proteolytic enzyme produced by the fermentation of Aspergillus microorganism | 0.5 |
| A mixture of crude drugs* | 10.0 |
| | 15.0 |

* The mixture of crude drugs contains:

| | Percent |
|---|---|
| Dried extract of atractylodes rhizoma | 3.75 |
| Dried extract of magnoliae cortex | 7.5 |
| Dried extract of aurantii pericarpium | 7.5 |
| Dried extract of liquiritae radix | 1.22 |
| Pulverized atractylodes rhizoma | 11.0 |
| Pulverized magnolia cortex | 23.0 |
| Pulverized aurantii pericarpium | 23.0 |
| Pulverized liquiritae radix | 3.0 |
| Pulverized shell of oyster | 14.0 |
| l-menthol | 0.03 |
| Starch | 6.00 |

(Atractylodes rhizoma is rhizoma of *Atractylodes japonica*; magnoliae cortex is bark of *Magnoliae officinalis*; aurantii pericarpium is bitter orange peel; and liquiritae radix is licorice root.)

It is understood that the aforementioned examples of the invention are preferred embodiments thereof, but in no way limit the invention. The cellulose produced as described in the aforestated specification may be admixed with any compatible drug compositions which are functionally equivalent to the materials of Example 9. The crude drugs of Example 9 exemplify a preferred embodiment of the inventive veterinary composition. However, the invention is not limited to such substituents but is limited solely by the appended claims.

Having thus disclosed the invention, I claim:

1. Cellulase-containing veterinary therapeutic for the treatment of diseases of the stomach and intestines in domestic animals, said therapeutic consisting essentially of cellulase produced by fermentation of a Rhizopus microorganism and of an excipient therefor, said cellulase
   (a) being thermostable up to three hours at temperatures up to 60° C.,
   (b) being more active in acidic pH ranges than alkaline pH ranges,
   (c) having an isoelectric point at about pH 10.6,
   (d) being soluble in water,
   (e) being insoluble in methanol, ethanol and acetone, and
   (f) having a cellulase activity of at least about 50,000 units per gram, the unit of cellulase activity per milligram being equal to $$\frac{3.436 \times 10^{0.00425A}}{N}$$

wherein A is the concentration of reduced sugar formed, in gammas per milliliter, when N milligrams of the said cellulase is added to a 0.5% solution of carboxymethyl-cellulose in a 0.05 mole acetic acid buffer solution of pH 5.0 and the mixture allowed to stand at 60° C. for one hour.

2. Cellulase-containing veterinary therapeutic according to claim 1 wherein the Rhizopus microorganism is *Rhizopus nigricans*.

3. Cellulase-containing veterinary therapeutic according to claim 1 wherein the Rhizopus microorganism is *Rhizopus chinensis*.

4. Cellulase-containing veterinary therapeutic according to claim 1 wherein the Rhizopus microorganism is *Rhizopus niveus*.

5. Cellulase-containing veterinary therapeutic according to claim 1 wherein the Rhizopus microorganism is *Rhizopus oryzae*.

6. A method of combating catarrhal diseases of the stomach and intestines in cattle, comprising feeding a cellulase-containing foodstuff to said diseased cattle, said foodstuff comprising roughage as the basal constituent.

7. A method of combating catarrhal diseases of the stomach and intestines in a dog, comprising feeding cellulase-containing foodstuff to said diseased dog, said foodstuff comprising roughage as the basal constituent.

8. A method of combating catarrhal diseases of the stomach and intestines in a horse, comprising feeding a cellulase-containing foodstuff to said diseased horse, said foodstuff comprising roughage as the basal constituent.

9. Cellulase-containing veterinary therapeutic composition for the treatment of diseases of the stomach and intestines in domestic animals, said composition comprising, as principal enzymatic ingredients, cellulase produced by the fermentation of a Rhizopus microorganism, said cellulase
   (a) being thermostable up to three hours at a temperature up to 60° C.
   (b) being more active in acidic pH ranges than alkaline pH ranges,
   (c) having an isoelectric point at about pH 10.6,
   (d) being soluble in water,
   (e) being insoluble in methanol, ethanol and acetone,
   (f) having a cellulase activity of at least about 50,000 units per gram, the unit of cellulase activity per milligram being equal to $$\frac{3.436 \times 10^{0.00425A}}{N}$$

wherein A is the concentration of reduced sugar formed, in gammas per milliliter, when N milligrams of the said cellulase is added to a 0.5% solution of carboxymethylcellulose in a 0.05 mole acetic acid buffer solution of pH 5.0 and the mixture allowed to stand at 60° C. for one hour, said cellulase being admixed with proteolytic enzyme produced by fermentation of Aspergillus microorganism and with a minor amount of rhizome of *Atractylodes japonica*, bark of *Magnoliae officinalis*, bitter orange peel and licorice root.

References Cited by the Examiner

UNITED STATES PATENTS 2,906,621  9/1959  Catron _____ 167—53

OTHER REFERENCES

Japanese Patent 18,089, Oct. 2, 1961 (application date February 10, 1959); abstracted in Chem. Abst., vol. 57, 1962, page 1389a.

JULIAN S. LEVITT, *Primary Examiner.*

FRANK CACCIAPAGLIA, JR., LEWIS GOTTS,
*Examiners.*